United States Patent
Du (10) Patent No.: US 11,556,605 B2
(45) Date of Patent: Jan. 17, 2023

(54) SEARCH METHOD, DEVICE AND STORAGE MEDIUM

(71) Applicant: Baidu Online Network Technology (Beijing) Co., Ltd., Beijing (CN)

(72) Inventor: Yajie Du, Beijing (CN)

(*) Notice: Subject to any disclaimer, the term of this patent is extended or adjusted under 35 U.S.C. 154(b) by 0 days.

(21) Appl. No.: 16/533,977

(22) Filed: Aug. 7, 2019

(65) Prior Publication Data

US 2019/0361952 A1    Nov. 28, 2019

(30) Foreign Application Priority Data

Aug. 8, 2018 (CN) .......................... 201810897484.2

(51) Int. Cl.
*G06F 16/9538* (2019.01)
*G06F 16/532* (2019.01)
*G06F 16/9535* (2019.01)

(52) U.S. Cl.
CPC ........ *G06F 16/9538* (2019.01); *G06F 16/532* (2019.01); *G06F 16/9535* (2019.01)

(58) Field of Classification Search
CPC ............. G06F 16/9538; G06F 16/9535; G06F 16/9536; G06F 16/951; G06F 16/532; G06F 16/50; G06F 16/535; G06F 16/7837; G06K 9/00671; G06K 6/00; G06V 20/20; G06V 10/54; G06V 10/56; G06V 10/46; G06V 10/40; G06V 30/18105
See application file for complete search history.

(56) References Cited

U.S. PATENT DOCUMENTS

| | | | | |
|---|---|---|---|---|
| 9,036,949 | B2 * | 5/2015 | Boncyk | H04N 5/44 382/305 |
| 9,424,472 | B2 * | 8/2016 | So | H04L 67/18 |
| 2007/0050374 | A1 * | 3/2007 | Zhao | G06F 16/3329 |
| 2014/0016825 | A1 * | 1/2014 | Kasahara | G06K 9/00671 382/103 |
| 2014/0080428 | A1 * | 3/2014 | Rhoads | H04W 4/70 455/88 |
| 2016/0050173 | A1 * | 2/2016 | Nakamura | H04N 1/00411 709/206 |
| 2018/0349417 | A1 * | 12/2018 | Lu | G06F 3/0482 |
| 2019/0391715 | A1 * | 12/2019 | Joyce | G06F 3/04845 |

FOREIGN PATENT DOCUMENTS

| | | |
|---|---|---|
| CN | 107111740 A | 8/2017 |
| CN | 107273372 A | 10/2017 |
| CN | 108038760 A | 5/2018 |

OTHER PUBLICATIONS

Patel, Rajan. "Google Lens: real-time answers to questions about the world around you", May 8, 2018. Google. (Year: 2018).*
Star Walk, User Manual, Star Walk ver. 7.03 and ver. 1.01, Jan. 2014 (Year: 2014).*

* cited by examiner

*Primary Examiner* — Tamara T Kyle
*Assistant Examiner* — Lana Alagic
(74) *Attorney, Agent, or Firm* — Harness, Dickey & Pierce, P.L.C.

(57) ABSTRACT

Embodiments of the present disclosure provide a search method, a device, and a storage medium. The method includes: identifying, by an AR technology, a target object to be searched, and acquiring search information of the target object, transmitting a search request to a server according to the search information, receiving a search result of the target object returned by the server. The method provided in the (Continued)

embodiments can quickly obtain an accurate search result and improves user experience.

11 Claims, 5 Drawing Sheets

SEARCH METHOD, DEVICE AND STORAGE MEDIUM

CROSS-REFERENCE TO RELATED APPLICATIONS

This application claims priority to Chinese Patent Application No. 201810897484.2, filed on Aug. 8, 2018, which is hereby incorporated by reference in its entirety.

TECHNICAL FIELD

Embodiments of the present disclosure relate to the field of information technologies, and in particular, to a search method, a device, and a storage medium.

BACKGROUND

With the popularization of computers and the development of information engineering, obtaining information from the Internet has become an important way for people's daily life and work. The Internet has now become a platform with increasingly abundant resources, and the entire Internet has gradually become a resource storage space with a large amount of information.

Currently, when a user conducts a search on a terminal device, the user usually inputs a keyword in a search input box of a search engine, and the search engine detects multiple search results corresponding to the keyword and presents them to the user.

However, the above solution makes the search results completely dependent on the keyword. If the keyword input by the user is not accurate enough, not only the search efficiency is low, but also the search results may be inaccurate, resulting in a poor user experience.

SUMMARY

The embodiments of the present disclosure provide a search method, a device, and a storage medium to solve the problem that the search efficiency is low and the results are not accurate in the prior art.

In a first aspect, an embodiment of the present disclosure provides a search method, including:

identifying, by an augmented reality (AR) technology, a target object to be searched, and acquiring search information of the target object, where the search information is used to represent a feature of the target object;

transmitting a search request to a server according to the search information, where the search request includes the search information; and receiving a search result of the target object returned by the server.

In a possible design, the method further includes: displaying the search result of the target object.

In a possible design, the identifying, by an augmented reality (AR) technology, a target object to be searched, and acquiring search information of the target object includes:

capturing a reality scene including the target object by a camera to acquire a scene image;

identifying objects in the scene image, obtaining a name of each of the objects, and superimposing and displaying the name of each of the objects in a scene by an AR method; and determining the target object, according to a user's operation, and acquiring a name of the target object, where the search information of the target object includes the name of the target object.

In a possible design, the identifying, by an augmented reality (AR) technology, a target object to be searched, and acquiring search information of the target object includes:

capturing a reality scene including the target object by a camera to acquire a scene image;

determining the target object from the scene image according to a user's operation; and identifying the target object, and obtaining a name of the target object, where the search information of the target object includes the name of the target object.

In a possible design, the method further includes: superimposing and displaying the name of the target object in a scene by an AR method.

In a possible design, the identifying, by an augmented reality (AR) technology, a target object to be searched, and acquiring search information of the target object includes:

capturing a reality scene including the target object by a camera to acquire a scene image;

determining the target object from the scene image according to a user's operation; and identifying the target object and obtaining image information of the target object, where the search information of the target object includes the image information of the target object.

In a possible design, the image information of the target object includes a color feature, a texture feature, and a shape feature of an image.

In a possible design, before the identifying, by an augmented reality (AR) technology, a target object to be searched, and acquiring search information of the target object, the method further includes:

starting an application according to a user's operation, where an interface of the application includes an AR search key.

In a possible design, the search result of the target object includes information in a text format and/or information in an animation format.

In a second aspect, an embodiment of the present disclosure provides a terminal device, including:

a processing module, configured to identify, by an augmented reality (AR) technology, a target object to be searched and acquire search information of the target object, where the search information is used to represent a feature of the target object;

a transmitting module, configured to transmit a search request to a server according to the search information, where the search request includes the search information; and a receiving module, configured to receive a search result of the target object returned by the server.

In a possible design, the terminal device further includes: a displaying module, configured to display the search result of the target object.

In a possible design, the processing module is specifically configured to:

capture a reality scene including the target object by a camera and acquire a scene image; and identify objects in the scene image, obtain a name of each of the objects; and the displaying module is further configured to superimpose and display the name of each of the objects in a scene by an AR method; and the processing module is further configured to determine the target object, according to a user's operation, and acquire a name of the target object, where the search information of the target object includes the name of the target object.

In a possible design, the processing module is specifically configured to:

capture a reality scene including the target object by a camera and acquire a scene image;

determine the target object from the scene image according to a user's operation; and identify the target object, and obtain a name of the target object, where the search information of the target object includes the name of the target object.

In a possible design, the displaying module is further configured to:

superimpose and display the name of the target object in a scene by an AR method.

In a possible design, the processing module is specifically configured to:

capture a reality scene including the target object by a camera and acquire a scene image;

determine the target object from the scene image according to a user's operation; and identify the target object, and obtain image information of the target object, where the search information of the target object includes the image information of the target object.

In a possible design, the image information of the target object includes a color feature, a texture feature, and a shape feature of an image.

In a possible design, the processing module is further configured to:

start an application according to a user's operation, where an interface of the application includes an AR search key.

In a possible design, the search result of the target object includes information in a text format and/or information in an animation format.

In a third aspect, an embodiment of the present disclosure provides a terminal device, including:

a transmitter, a receiver, a processor, a memory, a display and a computer program; the computer program is stored in the memory, and the processor executes the computer program to implement the search method described in the first aspect and the various possible designs of the first aspect.

In a fourth aspect, an embodiment of the present disclosure provides a computer readable storage medium, where the computer readable storage medium stores a computer program, and the computer program is used to implement the search method described in the first aspect and the various possible designs of the first aspect.

In the search method, the device, and the storage medium provided by the embodiments of the present disclosure, a target object to be searched is identified by an augmented reality (AR) technology and search information of the target object is acquired, where the search information is used to represent a feature of the target object; a search request is transmitted to a server according to the search information, where the search request includes the search information; and a search result of the target object returned by the server is received. In the embodiments, by a combination with the AR technology, the target object is identified, a keyword is obtained, and the keyword is transmitted to a server for a search, and accurate search results can be quickly obtained.

BRIEF DESCRIPTION OF DRAWINGS

In order to more clearly illustrate the technical solutions of the embodiments of the present disclosure or in the prior art, the drawings required for the description of the embodiments or the prior art will be briefly described below. Obviously, the drawings in the following description illustrate merely some embodiments of the present disclosure, and other drawings can be acquired from these drawings by the person ordinarily skilled in the art without creative efforts.

DESCRIPTION OF EMBODIMENTS

In order to make the purposes, technical solutions and advantages of the embodiments of the present disclosure clearer, the technical solutions in the embodiments of the present disclosure are clearly and completely described in the following with reference to the accompanying drawings in the embodiments of the present disclosure. It is obvious that the described embodiments are merely part of the embodiments of the present disclosure, and not all embodiments. All other embodiments acquired by those skilled in the art based on the embodiments of the present disclosure without creative efforts are within the protection scope of the present disclosure.

In an existing search method, a user usually inputs a keyword in a search input box of a search engine, and the search engine detects multiple search results corresponding to the keyword and presents them to the user. For example, when the user inputs "pine tree" in the search input box, the search engine retrieves multiple search results corresponding to "pine tree", for example, "ancient poetry about the pine tree", "morphological characteristics of the pine tree", "growth environments of the pine tree", etc., and presents them to the user in an image-text form.

However, the existing search method completely depends on the keyword input by the user, if the keyword input by the user is not accurate enough, not only the search efficiency is low, but also the search results may be inaccurate, resulting in a poor user experience.

In order to solve the above problem, the present disclosure provides a search method, the method is to obtain search information of the target object based on an AR technology and thereby acquire a search result, improving the accuracy of the search result and improving the user experience. A brief description of the AR technology is given below.

The AR technology is a technology for calculating a position and an angle of a camera image in real time and adding a corresponding image. A goal of this technology is to put a virtual world in a real world on a screen and perform interaction.

Specifically, the AR technology is a new technology that integrates real world information and virtual world information "seamlessly", in which physical information (visual information, sound, taste, touch, etc.) that originally is rarely experienced in a certain time and space of the real world is simulated and then superimposed through computer and other scientific technologies, and virtual information is applied to the real world, and is perceived by human sense organs, so as to achieve a sensory experience beyond reality. A real environment and virtual objects are superimposed in real time on a same picture or space.

Here, an above introduction focuses on "displaying", and the AR technology can also be applied to identifying and tracking fields. For example, currently some marketing activities on a market, "scanning for money" to get a voucher, scanning a physical bottle to obtain a related 3D animation, and identifying tagged pictures to find red packets, etc., all use AR identifying and tracking technologies, and the present disclosure focuses on the use of AR identifying technology.

Detailed description will be made below using detailed embodiments.

Figure 1:
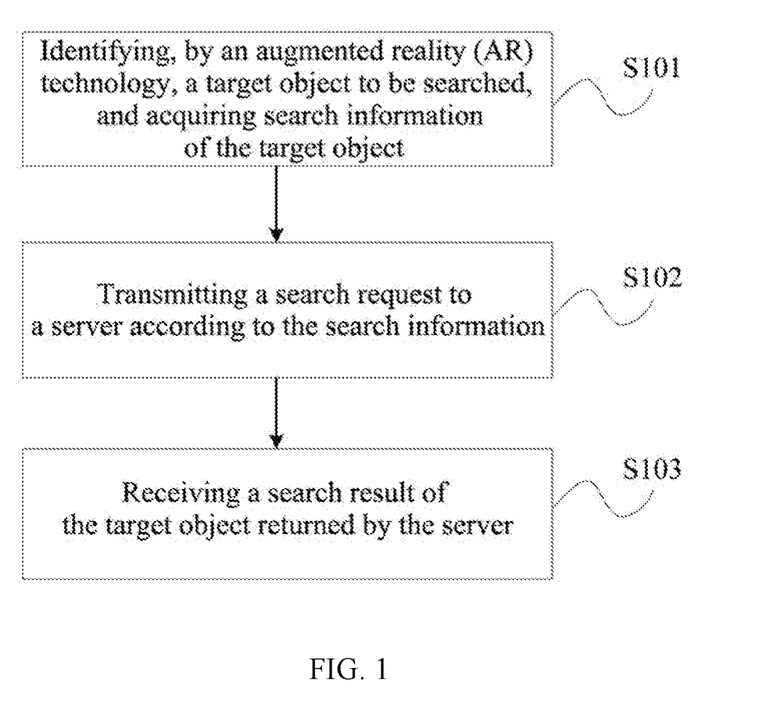
FIG. 1 is a first schematic diagram of a flow of a search method according to an embodiment of the present disclosure.

FIG. 1 is a first schematic diagram of a flow of a search method according to an embodiment of the present disclosure. An execution subject of this solution may be a terminal device such as a mobile phone, a tablet computer, a notebook computer and a computer capable of performing a search function through an application, and as shown in FIG. 1, the method includes:

S101: identifying, by an augmented reality (AR) technology, a target object to be searched and acquiring search information of the target object.

It should be understood that when the terminal device is a mobile phone, the camera may be a built-in camera of the mobile phone, or may be an external camera, for example, a camera on a headset. The headset is connected to the mobile phone through a network, and the mobile phone can send a turn-on command to the headset to start the camera on the headset.

In a specific implementation, a search engine installed in the terminal device is turned on, an AR search key is triggered, and the camera is also turned on. Specifically, the terminal device can support voice input, and a user turns on the search engine and the AR search key by voice. At this time, a scan box appears, and the target object to be searched is aligned in the scan box, and the target object to be searched is identified by the AR identifying technology, and the search information of the target object is obtained. The search information can be used to represent a feature of the target object, which can be a name of the object, such as a lion, a peach blossom, a dolphin, etc., or location information of the object, such as a zoo, a garden, an aquarium, and the like. After the search information of the target object is identified, the target object may be superimposed and displayed in a scene by an AR method. A displaying form of the target object may be a form of a vivid animation, and may also be a static form.

S102: transmitting a search request to a server according to the search information.

In a specific implementation, after the search information is obtained, the search information may be copied to the search input box of the search engine to transmit the search request to the server; or the identified search information is directly clicked to transmit the search request to the server. It should be understood that the search request should include the search information so that the server can accurately obtain the user's search request.

S103: receiving a search result of the target object returned by the server.

In this step, after receiving the search request transmitted by the terminal device, the server starts doing a search, and then returns the search result to the terminal device, that is, the terminal device receives the search result of the target object returned by the server.

Optionally, the search result of the target object includes information in a text format and/or information in an animation format, the animation form may include a question-answer form, the search information transmitted to the server may be a party raising a "question", the search result of the target object returned by the service may be a party giving an "answer", and the search result may be multiple and displayed to the user in a scrolling form; or the search result may be transmitted to the user's terminal device in a form of a short message.

The search method provided by this embodiment, in which a target object to be searched is identified by an augmented reality (AR) technology, search information of the target object is acquired, a search request is transmitted to a server according to the search information, and a search result of the target object returned by the server is received, can quickly obtain an accurate search result.

Figure 2:
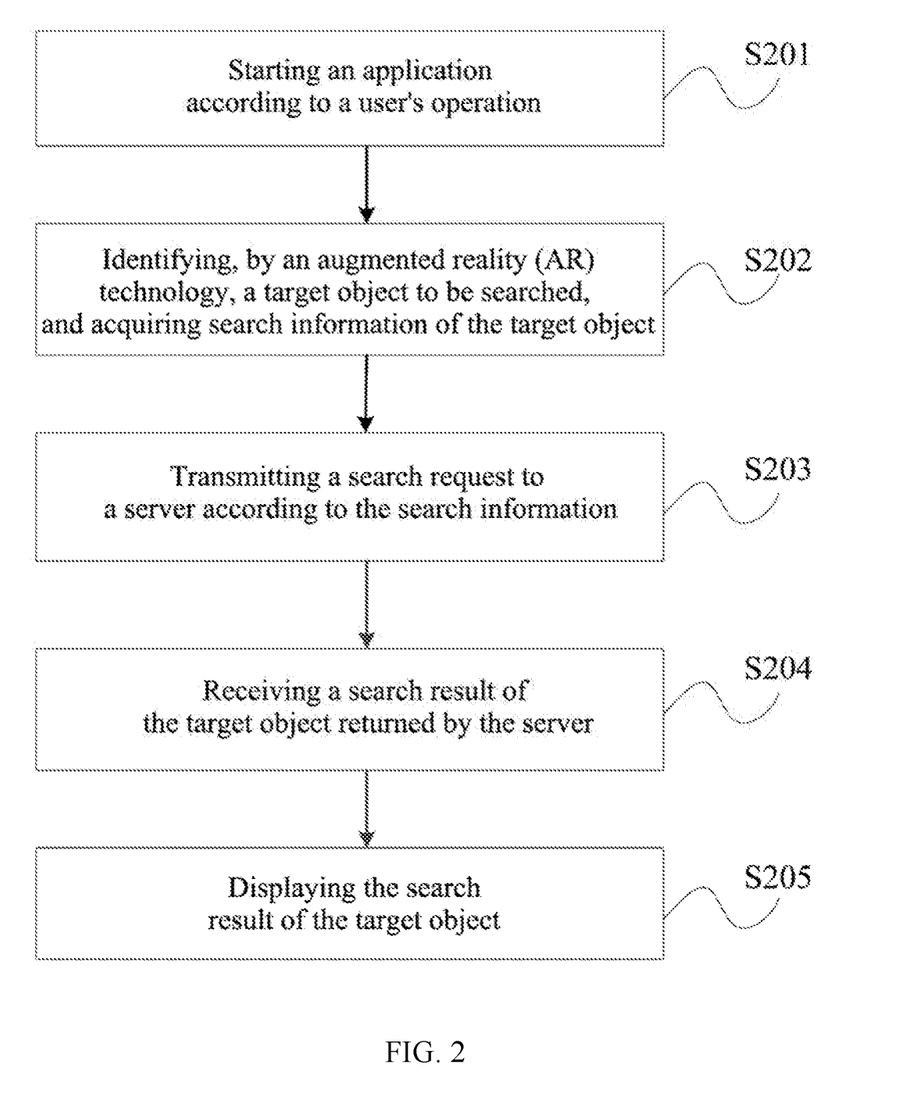
FIG. 2 is a second schematic diagram of a flow of a search method according to an embodiment of the present disclosure.

FIG. 2 is a second schematic diagram of a flow of a search method according to an embodiment of the present disclosure. A specific implementation of this embodiment is described in detail based on the embodiment of FIG. 1. As shown in FIG. 2, the method includes:

S201: starting an application according to a user's operation.

In this step, the application or a webpage is preset with an AR search key, and the application or the webpage gets started according to the user's operation, a user interface of the application or the webpage may include the AR search key. After the AR search key is triggered, the camera may be activated and the target object is AR-identified.

S202: identifying, by an augmented reality (AR) technology, a target object to be searched and acquiring search information of the target object.

S203: transmitting a search request to a server according to the search information.

S204: receiving a search result of the target object returned by the server.

The specific implementations of the foregoing steps S202-S204 and S101-S103 in the embodiment of FIG. 1 are similar, and details are not described here again.

S205: displaying the search result of the target object.

The search result of the target object is displayed. Optionally, the search result of the target object may include multiple results, and is transmitted to the user's terminal device in a text and/or animation form or is displayed in a form of a scroll bar.

Optionally, if the search result of the target object searched by the server is obviously wrong, the identified search information of the target object may be incorrect, where for example the target object is "peach blossom" but the identified search information is "apple", if the user does not notice this and the search information is directly transmitted to the server for a search, and the search result returned by the server is obviously related information about "apple", then steps S201-S205 can be re-performed. Or, if an interface of the search result is displayed incorrectly due to a network issue or the like, it is possible to wait a few minutes, and when the network turns normal, the search request is transmitted to the server again according to the search information.

The search method provided by this embodiment, in which an application gets started according to a user's operation, then a target object to be searched is identified by an augmented reality (AR) technology and search information of the target object is acquired, a search request is transmitted to a server according to the search information, and a search result of the target object returned by the server is received and the search result of the target object is displayed, can quickly and visually obtain an accurate search result.

Figure 3:
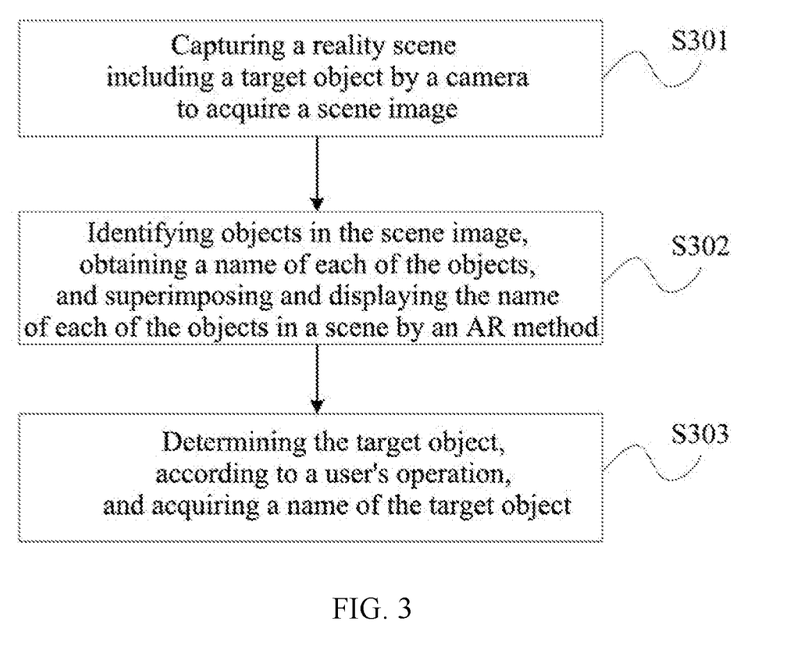
FIG. 3 is a third schematic diagram of a flow of a search method according to an embodiment of the present disclosure.

FIG. 3 is a third schematic diagram of a flow of a search method according to an embodiment of the present disclosure. As shown in FIG. 3, step S101 specifically includes the following steps:

S301: capturing a reality scene including the target object by a camera to acquire a scene image.

In an implementation, the AR search key of the application or the webpage gets started, and at the same time, the camera is turned on, and the reality scene is captured by the built-in or external camera of the terminal device to obtain the scene image, where there may be multiple objects in the scene image, and the target object is also included.

S302: identifying objects in the scene image, obtaining a name of each of the objects, and superimposing and displaying the name of each of the objects in a scene by an AR method.

In this step, a plurality of objects in the scene image are identified by the AR technology, and the name of each of the objects are obtained. The names of the objects can be superimposed and displayed in the scene by the AR method. Optionally, the names of the objects may be Chinese and/or English and/or Pinyin. Optionally, images of the objects may also be superimposed and displayed in the scene by the AR method, and the images may be static pictures or dynamic pictures with music.

Optionally, it is also possible to determine the target object from the scene image according to the user's operation, and then identify the target object, and obtain the name of the target object. Specifically, the target object is clicked from the scene image to determine the target object, and the target object is identified using the AR technology to obtain the name of the target object. The name of the target object and the image of the target object may also be superimposed and displayed in the scene by the AR method, and the name of the target object may include Chinese and/or English and/or Pinyin, and the image of the target object is a static picture or a dynamic picture with music.

S303: determining the target object, according to a user's operation, and acquiring a name of the target object.

In this step, it is possible to click the identified name of the target object or click the image of the target object to determine the target object and acquire the name of the target object, where the search information of the target object may include the name of the target object.

The search method provided by the present embodiment, in which a reality scene including the target object is captured by a camera and a scene image is acquired, objects in the scene image are identified, a name of each of the objects is obtained, the name of each of the objects is superimposed and displayed in a scene by an AR method, then the target object is determined according to a user's operation, and a name of the target object is acquired, can quickly and accurately obtain the search information to obtain an accurate search result.

Figure 4:
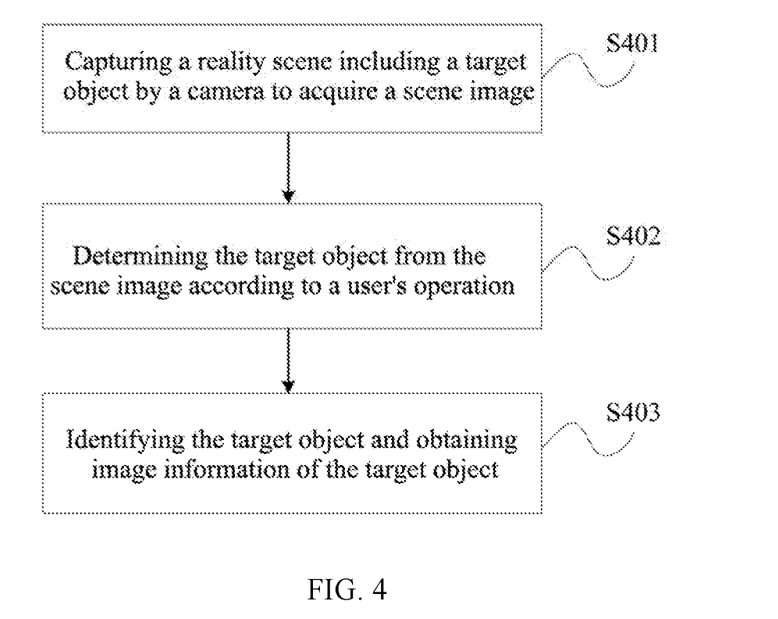
FIG. 4 is a fourth schematic diagram of a flow of a search method according to an embodiment of the present disclosure.

FIG. 4 is a fourth schematic diagram of a flow of a search method according to an embodiment of the present disclosure. As shown in FIG. 4, step S101 may further include the following steps:

S401: capturing a reality scene including the target object by a camera to acquire a scene image.

In an implementation, the AR search key of the application or the webpage gets started, and at the same time, the camera is turned on, and the reality scene is captured by the built-in or external camera of the terminal device to obtain the scene image including the target object.

S402: determining the target object from the scene image according to a user's operation.

In this step, the user can click the target object in the scene image to cause the terminal device to determine the target object from the scene image.

S403: identifying the target object and obtaining image information of the target object.

In this step, the target object is identified by the AR technology, and the image information of the target object, for example, the color feature, the texture feature, and the shape feature of the image, is obtained. The search information of the target object includes the image information of the target object, so that the server conducts a search based on the search information. Optionally, it is also possible to display the image of the target object by the AR technology. The image of the target object is a static picture or a dynamic picture with music. For example, when the target object is "peach blossom", after the color feature of the "peach blossom" is identified, the "peach blossom" is dynamically displayed and configured with custom music.

Optionally, if the name of the object is not identified in step S302, the steps of this embodiment may be performed, that is, the image information of the target object is used as the search information for the server to search.

The search method provided by this embodiment, in which a reality scene including the target object is captured by a camera and a scene image is acquired, the target object is determined from the scene image according to a user's operation, the target object is identified, and image information of the target object is obtained, can quickly and accurately obtain the search information to obtain an accurate search result.

Figure 5:
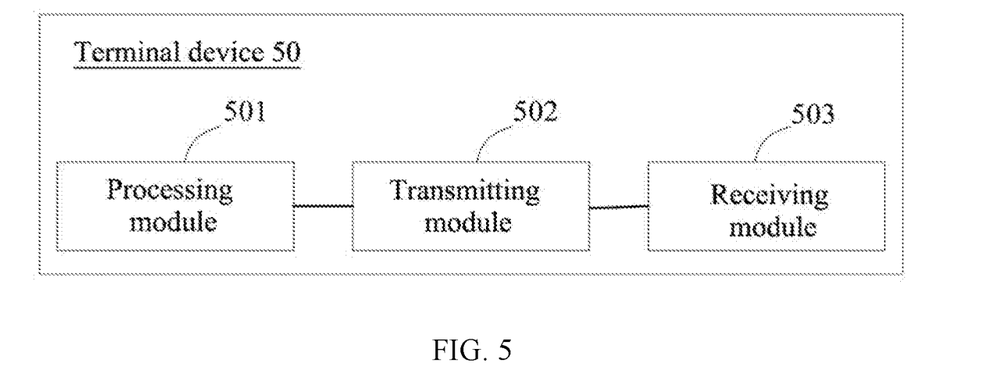
FIG. 5 is a first schematic diagram of a structure of a terminal device according to an embodiment of the present disclosure.

FIG. 5 is a first schematic diagram of a structure of a terminal device according to an embodiment of the present disclosure. As shown in FIG. 5, a terminal device 50 provided by the embodiment of the present disclosure includes: a processing module 501, a transmitting module 502, and a receiving module 503.

The processing module 501 is configured to identify, by an augmented reality (AR) technology, a target object to be searched and acquire search information of the target object, where the search information is used to represent a feature of the target object;

the transmitting module 502 is configured to transmit a search request to a server according to the search information, where the search request includes the search information;

the receiving module 503 is configured to receive a search result of the target object returned by the server.

The terminal device provided by the present embodiment, with which a target object to be searched is identified by an augmented reality (AR) technology and search information of the target object is acquired, a search request is transmitted to a server according to the search information, and a search result of the target object returned by the server is received, can quickly obtain an accurate search result.

Figure 6:
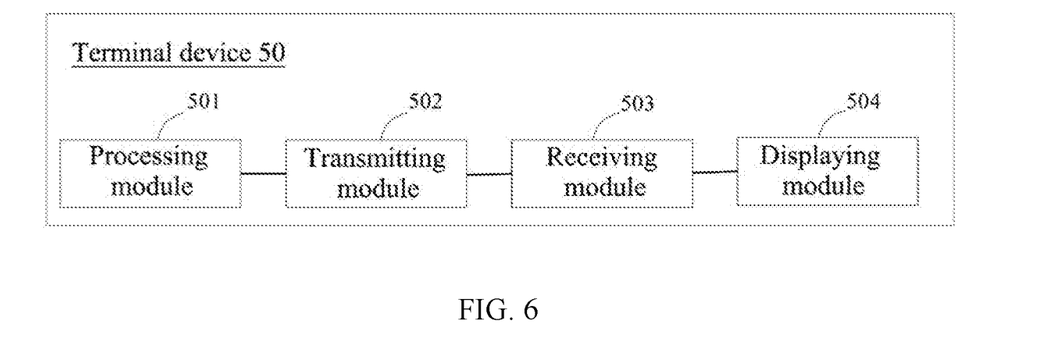
FIG. 6 is a second schematic diagram of a structure of a terminal device according to an embodiment of the present disclosure.

FIG. 6 is a second schematic diagram of a structure of a terminal device according to an embodiment of the present disclosure. As shown in FIG. 6, in this embodiment, based on the embodiment of FIG. 5, the terminal device further includes: a displaying module 504.

The displaying module 504 is configured to display the search result of the target object.

In a possible design, the processing module 501 is specifically configured to:

capture a reality scene including the target object by a camera and acquire a scene image; and identify objects in the scene image, obtain a name of each of the objects; and the displaying module 504 is further configured to superimpose and display the name of each of the objects in a scene by an AR method; and the processing module 501 is further configured to determine the target object, according to a user's operation, and acquire a name of the target object, where the search information of the target object includes the name of the target object.

In a possible design, the processing module 501 is specifically configured to:

capture a reality scene including the target object by a camera and acquire a scene image;

determine the target object from the scene image according to a user's operation; and identify the target object, and obtain a name of the target object, where the search information of the target object includes the name of the target object.

In a possible design, the displaying module 504 is further configured to:

superimpose and display the name of the target object in a scene by an AR method.

In a possible design, the processing module 501 is specifically configured to:

capture a reality scene including the target object by a camera and acquire a scene image;

determine the target object from the scene image according to a user's operation; and identify the target object, and obtain image information of the target object, where the search information of the target object includes the image information of the target object.

In a possible design, the image information of the target object includes a color feature, a texture feature, and a shape feature of the image.

In a possible design, the processing module is further configured to:

start an application according to a user's operation, where an interface of the application includes an AR search key.

In a possible design, the search result of the target object includes information in a text format and/or information in an animation format.

The terminal device provided by the present embodiment, by displaying the search result of the target object, can quickly and visually obtain an accurate search result.

Figure 7:
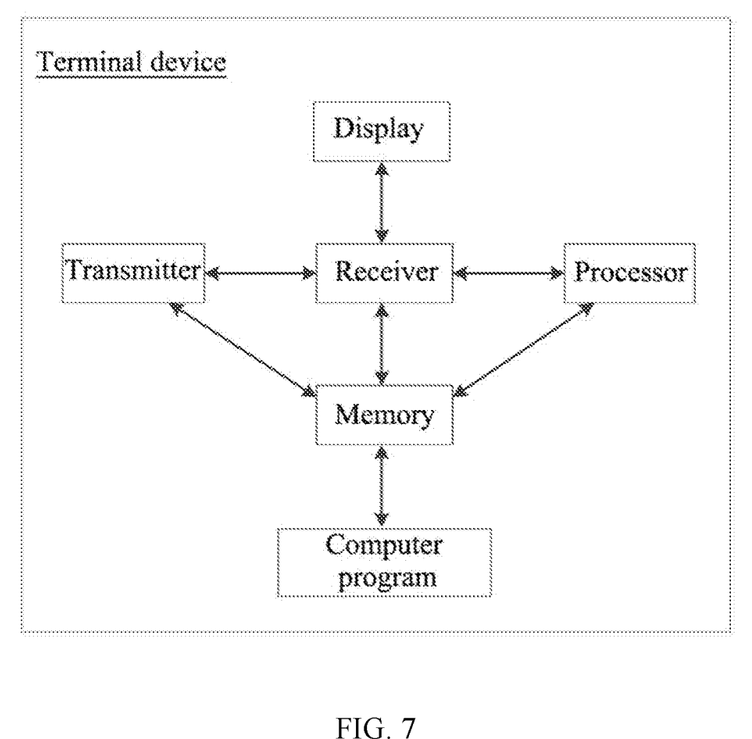
FIG. 7 is a schematic diagram of a hardware structure of a terminal device according to an embodiment of the present disclosure.

FIG. 7 is a schematic diagram of a hardware structure of a terminal device according to an embodiment of the present disclosure. As shown in FIG. 7, the terminal device of this embodiment includes: a transmitter, a receiver, a processor, a memory and a display, where the transmitter is configured to implement the steps to be performed by the transmitting module of the terminal device in the foregoing embodiments;

the receiver is configured to implement the steps to be performed by the receiving module of the terminal device in the foregoing embodiments;

the memory is configured to store a computer executable instruction;

the processor is configured to execute the computer executable instruction stored in the memory to implement the steps performed by the processing module of the terminal device in the above embodiments. For details, reference can be made to the related description in the foregoing method embodiments.

The display is configured to implement the steps performed by the displaying module in the foregoing embodiments.

An embodiment of the disclosure further provides a computer readable storage medium, the computer readable storage medium stores a computer executable instruction, and when a processor executes the computer executable instruction, the search method as described above is implemented.

In several embodiments provided by the present disclosure, it should be understood that the disclosed device and method may be implemented in other manners. For example, the device embodiments described above are only illustrative. For example, division of the modules is only a logical function division, and an actual implementation may have another division manner. For example, multiple modules may be combined or may be integrated into another system, or some features may be ignored or not be executed. In addition, mutual coupling or direct coupling or communication connection shown or discussed may be an indirect coupling or communication connection through some interfaces, devices or modules, and may be electrical, mechanical or otherwise.

The modules described as separate components may or may not be physically separated, and components displayed as modules may or may not be physical units, that is, may be located in one place, or may be distributed to multiple network units. Some or all of the modules may be selected according to actual needs to achieve the purpose of the solution of the embodiment.

In addition, each functional module in each embodiment of the present disclosure may be integrated into one processing unit, or each module may exist physically and separately, or two or more modules may be integrated into one unit. The unit formed by the above modules can be implemented in a form of hardware or in a form of hardware plus software functional units.

The above-described integrated modules implemented in a form of software functional modules can be stored in a computer readable storage medium. The software functional modules described above are stored in a storage medium and include instructions for causing a computer device (can be a personal computer, a server, or a network device, etc.) or a processor to execute portions of the steps of the methods described in various embodiments of the present disclosure.

It should be understood that the foregoing processor may be a central processing unit (CPU), or may be other general-purpose processors, a digital signal processor (DSP), an application specific integrated circuit (ASIC), or the like. The general purpose processor may be a microprocessor or the processor may be any conventional processor or the like. The steps of the method disclosed in connection with the disclosure may be directly embodied by an execution of a hardware processor or by an execution of a combination of hardware and software modules in the processor.

The memory may include high speed RAM memory, and may also include non-volatile memory NVM, such as at least one disk memory, and may also be a USB flash drive, a removable hard disk, a read only memory, a magnetic disk, or an optical disk.

The bus may be an Industry Standard Architecture (ISA) bus, a Peripheral Component (PCI) bus, or an Extended Industry Standard Architecture (EISA) bus. The bus can be divided into an address bus, a data bus, a control bus, and the like. For ease of representation, the bus in the drawings of the present disclosure is not limited to only one bus or one type of bus.

The above storage medium may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or an optical disk. A storage medium may be any available media that can be accessed by a general purpose or special purpose computer.

An exemplary storage medium is coupled to the processor to enable the processor to read information from, and write information to, the storage medium. Of course, the storage medium can also be an integral part of the processor. The processor and the storage medium may be located in an Application Specific Integrated Circuit (ASIC). Of course, the processor and the storage medium may also exist as discrete components in an electronic device or a host device.

Persons of ordinary skill in the art will understand that all or part of the steps to implement the various method embodiments described above may be accomplished by hardware associated with a program instruction. The aforementioned program can be stored in a computer readable storage medium. The program, when being executed, performs the steps including the foregoing method embodiments; and the foregoing storage medium includes various media that can store program codes, such as a ROM, a RAM, a magnetic disk, or an optical disk.

Finally, it should be noted that the above embodiments are only for illustrating the technical solutions of the present disclosure, and are not to limit them; although the present disclosure has been described in detail with reference to the foregoing embodiments, it should be understood by persons of ordinary skill in the art that the technical solutions described in the foregoing embodiments may be modified, or some or all of the technical features may be equivalently replaced. However, these modifications and replacements do not depart from the scope of the technical solutions of the embodiments of the present disclosure.

What is claimed is:

1. A search method, comprising:
    identifying, by a processor, by an augmented reality (AR) technology, a target object to be searched, and acquiring, by the processor, search information of the target object, wherein the search information is used to represent a feature of the target object;
    transmitting, by a transmitter, a search request to a server according to the search information, wherein the search request comprises the search information;
    receiving, by a receiver, a search result of the target object returned by the server; and
    displaying, by a display, the search result of the target object;
    wherein the identifying, by a processor, by an augmented reality (AR) technology, a target object to be searched, and acquiring, by the processor, search information of the target object comprises:
    capturing a reality scene comprising the target object by a camera to acquire a scene image, wherein the scene image comprises the target object;
    identifying, by the processor, objects in the scene image, obtaining a dynamic picture with music of each of the objects, and superimposing and displaying, by the display, the dynamic picture with music of each of the objects in a scene by an AR method; and
    after the superimposing and displaying, determining, by the processor, the target object, according to a user's operation;
    wherein the user's operation is clicking a superimposed and displayed image of the target object, the search result of the target object comprises information in an animation format, and the animation format comprises a question-answer form.

2. The method according to claim 1, further comprising:
    identifying and obtaining image information of the target object, wherein the search information of the target object comprises the image information of the target object.

3. The method according to claim 2, wherein the image information of the target object comprises a color feature, a texture feature, and a shape feature of an image.

4. The method according to claim 1, wherein before the identifying, by a processor, by an augmented reality (AR) technology, a target object to be searched, and acquiring, by the processor, search information of the target object, the method further comprises:
    starting an application according to a user's operation, wherein an interface of the application comprises an AR search key.

5. The method according to claim 1, wherein the search result of the target object comprises information in a text format and/or information in an animation format.

6. A terminal device, comprising: a transmitter, a receiver, a processor, a memory, a display, and a computer program, wherein the computer program is stored in the memory, and the computer program, when executed by the processor, causes the processor to identify, by an augmented reality (AR) technology, a target object to be searched and acquire search information of the target object, wherein the search information is used to represent a feature of the target object; the transmitter is configured to transmit a search request to a server according to the search information, wherein the search request comprises the search information; and the receiver is configured to receive a search result of the target object returned by the server; wherein the computer program further causes the processor to: capture a reality scene comprising the target object by a camera to acquire a scene image, wherein the scene image comprises the target object; and identify objects in the scene image, and obtain a dynamic picture with music of each of the objects; the display is configured to superimpose and display the dynamic picture with music of each of the objects in a scene by an AR method; and the computer program further causes the processor to determine the target object according to a user's operation after the display superimposes and displays at least one of a name and an image of each of the objects in the scene by the AR method, and acquire a name of the target object, wherein the search information of the target object comprises the name of the target object; wherein the user's operation is clicking a superimposed and displayed image of the target object, the search result of the target object comprises information in an animation format, and the animation format comprises a question-answer form; wherein the display is further configured to: display the search result of the target object.

7. The device according to claim 6, wherein the computer program further causes the processor to:

identify and obtain image information of the target object, wherein the search information of the target object comprises the image information of the target object.

8. The device according to claim 7, wherein the image information of the target object comprises a color feature, a texture feature, and a shape feature of an image.

9. The device according to claim 6, wherein the computer program further causes the processor to:
   start an application according to a user's operation, wherein an interface of the application comprises an AR search key.

10. The device according to claim 6, wherein the search result of the target object comprises information in a text format and/or information in an animation format.

11. A non-transitory computer readable storage medium, wherein the computer readable storage medium stores a computer program, and the computer program is to implement a search method comprising:
   identifying, by a processor, by an augmented reality (AR) technology, a target object to be searched, and acquiring, by the processor, search information of the target object, wherein the search information is used to represent a feature of the target object;
   transmitting, by a transmitter, a search request to a server according to the search information, wherein the search request comprises the search information;
   receiving, by a receiver, a search result of the target object returned by the server; and
   displaying, by a display, the search result of the target object;
   wherein the identifying, by a processor, by an augmented reality (AR) technology, a target object to be searched, and acquiring, by the processor, search information of the target object comprises:
   capturing a reality scene comprising the target object by a camera to acquire a scene image, wherein the scene image comprises the target object;
   identifying objects in the scene image, obtaining, by the processor, a dynamic picture with music of each of the objects, and superimposing and displaying, by the display, the dynamic picture with music of each of the objects in a scene by an AR method; and
   after the superimposing and displaying, determining the target object, according to a user's operation, and acquiring a name of the target object, wherein the search information of the target object comprises the name of the target object;
   wherein the user's operation is clicking a superimposed and displayed image of the target object, the search result of the target object comprises information in an animation format, and the animation format comprises a question-answer form.

* * * * *